United States Patent [19]
Tyren

[11] Patent Number: 6,137,411
[45] Date of Patent: Oct. 24, 2000

[54] ARTICLE SURVEILLANCE SYSTEM

[75] Inventor: Carl Tyren, Monaco, Monaco

[73] Assignee: RSO Corporation N.V., Curacao, Netherlands Antilles

[21] Appl. No.: 09/125,131

[22] PCT Filed: Feb. 11, 1997

[86] PCT No.: PCT/SE97/00199

§ 371 Date: Oct. 21, 1998

§ 102(e) Date: Oct. 21, 1998

[87] PCT Pub. No.: WO97/29464

PCT Pub. Date: Aug. 14, 1997

[30] Foreign Application Priority Data

Feb. 12, 1996 [SE] Sweden .................................. 9600528
Mar. 19, 1996 [SE] Sweden .................................. 9601033

[51] Int. Cl.$^7$ ............................................. G08B 13/14
[52] U.S. Cl. ................................. 340/572.1; 340/572.2; 340/572.5; 340/572.6
[58] Field of Search ........................... 340/572.1, 572.2, 340/572.5, 572.6, 551

[56] References Cited

U.S. PATENT DOCUMENTS

| | | | |
|---|---|---|---|
| 3,582,931 | 6/1971 | Nawrocki | 340/572.1 |
| 3,790,945 | 2/1974 | Fearon | 340/572.2 |
| 4,123,749 | 10/1978 | Hartmann et al. | |
| 4,352,098 | 9/1982 | Stephen et al. | 340/572.2 |
| 4,700,179 | 10/1987 | Fancher | 340/572.2 |
| 5,030,940 | 7/1991 | Siikaria | |
| 5,304,983 | 4/1994 | Zhou et al. | |
| 5,331,313 | 7/1994 | Koning | 340/572.6 |
| 5,406,262 | 4/1995 | Herman et al. | |
| 5,812,065 | 9/1998 | Schrott et al. | 340/572.5 |

FOREIGN PATENT DOCUMENTS

| | | |
|---|---|---|
| 0 338 696 | 10/1989 | European Pat. Off. |
| WO 93/14478 | 7/1993 | WIPO |

*Primary Examiner*—Daniel J. Wu
*Assistant Examiner*—John Tweel, Jr.
*Attorney, Agent, or Firm*—Merchant & Gould P.C.

[57] ABSTRACT

An article surveillance system for detecting the presence of articles in a detection zone (18) has at least one transmitter means (11, 13) and at least one receiver means (12, 15) for transmitting and receiving, respectively, electromagnetic radio-frequency signals in the detection zone or in proximity thereof. Each article is provided with a sensor or marker (20) operating as a transponder for transmitting an electromagnetic radio-frequency reply signal to the receiver means when receiving a signal from the transmitter means. Furthermore, the system has a coil arrangement (16) with driving means (17) for generating a low-frequent magnetic modulating field in the detection zone (18), and a controller (14) operatively connected to the transmitter means (11, 13), the receiver means (12, 15) and the coil arrangement (16, 17). Each sensor (20) is arranged to transmit a reply signal, the amplitude of which is modulated by the magnetic modulating field, and the receiver means is arranged to receive and to demodulate the amplitude-modulated reply signal. The controller (14) is arranged to supply modulating signals ($^f$mod) to the coil arrangement (16, 17), to receive the demodulated signals ($^f$demod) from the receiver means (12, 15) and to use the demodulated signals ($^f$demod) when determining the position of the sensor (20) in relation to the detection zone (18).

15 Claims, 9 Drawing Sheets

ARTICLE SURVEILLANCE SYSTEM

TECHNICAL FIELD

The present invention relates to an article surveillance system for detecting the presence of articles in a detection zone, comprising at least one transmitter means and at least one receiver means for transmitting and receiving, respectively, electromagnetic radio-frequency signals within the detection zone or in a proximity thereof, each article being provided with a sensor operating as a transponder for transmitting an electromagnetic radio-frequency reply signal to said receiver means when receiving a signal from said transmitter means.

DESCRIPTION OF THE PRIOR ART

For many years now a substantial need for simple and still reliable surveillance systems for monitoring objects or articles within a given area has been noticed in various business and industrial applications. A common example is the electronic shop antipilferage systems, which are available in many different kinds.

According to a common kind of electronic article surveillance systems each article is provided with a small label or marker, which comprises a thin metal strip with magnetic properties. At both sides of the shop exit arc-shaped magnetic field generating means are arranged for generating a magnetic field there between. When an article, which has been provided with an antipilferage label according to the above, is carried in between the arcs, the metallic strip is affected by the magnetic field and a detectable physical change occurs in the metal strip. It is common to make use of the fact that an alternating magnetic field will periodically switch the magnetic moment of dipole in the metallic strip. Alternatively, the metallic strip may be forced into mechanical resonance, provided that the material and dimenions of the strip are chosen accordingly. These physical changes are inductively detected by the arcs, wherein an attempted theft may be registered. Since the detection is made by inductive means, antipilferage systems of this kind suffer from a short detection range of a few meters only, which means that the antipilferage arcs must be arranged close to each other and which in turn makes the shop exit narrow and "unfriendly" for the customers.

In addition various antipilferage systems of a more advanced type are previously known. For instance, U.S. Pat. No. 5,030,940 discloses an electronic article surveillance system. Electronic labels are used for marking and theft-protecting the desired articles. Such an electronic label is of a radio-frequency transponder type and comprises for instance an antenna, a power source, such as a battery, and a non-linear circuit, for instance some kind of semiconductor diode. Through its antenna the transponder may receive a first electromagnetic signal of a high frequency, which has been transmitted by a transmitter in the surveillance zone, as well as a second signal of a substantially lower frequency, by means of which an electrostatic field is generated in the surveillance zone. By varying the electrostatic field, certain properties of the non-linear circuit are influenced, the most important of which being the electric reactance. These variations in reactance are amplified by the power source. The antenna is connected to the non-linear circuit, and hence a reply signal may be transmitted, which according to the above is composed by the two signals received. When a modified reply signal is detected according to the above by a receiver in the surveillance zone, the system may determine the presence of an article within the surveillance zone and provide a suitable alarm signal as a consequence thereof. A drawback of such a system is the relatively high price per unit due to the complexity of the sensor, thus making the system less suitable for instance for mass surveillance of articles in a shop. Furthermore, the electrostatic field may quite easily be shielded (so as to avoid detection), for instance by placing the article and the sensor inside a metallic housing, such as a bag covered with a metallic foil on its inside. In addition, a major portion of the electrostatic field will be shielded, if the article and the sensor are placed between human body parts, for instance in the armpit.

Normally, for basic antipilferage applications as described above, it is only desired to determine the presence of a transponder or sensor in a surveillance zone, but not its identity or exact position in the zone. Such determination, however, is of interest in a similar technical field, such as price labelling of articles. A method and a device for this purpose are disclosed in WO93/14478. A label acting as a sensor or transponder is provided with an antenna and at least one electric resonance circuit, comprising inductive as well as capacitive means; a so-called LC-circuit. The resonance circuit is excited to self-oscillation by means of electromagnetic energy transmitted by an excitation means and received through the antenna of the sensor. By providing the label with an amorphous magnetic element and controlling the permeability of this element by means of an external heterogeneous magnetic bias field, also the resonance frequency of the resonance circuit may be controlled, since the change in permeability for the element will affect the inductive properties of the resonance circuit. Due to the factors described above the frequency of the reply signal transmitted from the resonance circuit is dependent upon the magnitude and the direction of the magnetic bias field at the current position of the sensor in question. As a consequence a simultaneous detection of a plurality of identical sensors present in the surveillance zone is possible, thanks to the reply signals thereof being separated in the frequency domain through their different magnetic bias levels. Alternatively, a calculation "backwards" in three dimensions of the position for any given sensor is possible by means of the detected frequency value, provided that the heterogeneous magnetic bias field is known. By arranging a plurality of labels and/or amorphous magnetic elements in predetermined positions with respect to each other, a given code space may be obtained, wherein the reply signal may for instance represent an article number assigned to the article.

To combine requirements for a long detection range with requirements for a high degree of detection reliability, i.e. a minimum risk of false alarms as well as non-detections, has proven difficult for the known article surveillance systems described above. For systems with a relatively long detection range, such as for instance the one described above with reference to U.S. Pat. No. 5,030,940, there is a substantial risk of articles located outside the intended detection zone being reached by interrogation signals from the system, wherein such articles will reply to these signals and give rise to a false alarm situation. The disadvantage of such a situation in shops etc may easily be imagined; an honest customer inside the shop carrying a protected article close to the intended detection zone—the shop exit—may fully unintentionally become the subject of a triggered antipilferage alarm. On the other hand, such false alarms are less likely in systems of the type described above, where the detection is made inductively between metallic arcs, but instead there is a disadvantage of having to arrange the relatively large and bulky detection arcs close to each other and at a ground plane level, which results in a narrow and unfriendly shop exit.

SUMMARY OF THE INVENTION

It is an object of the present invention to provide an article surveillance system with a detection range long enough for being capable of monitoring a detection zone with a width of several meters as well as with a well-defined detection zone and a minimum risk of false alarms.

Another object of the invention is to provide sectorization of the detection zone with the ability of a more precise determination of the particular sector within the detection zone, in which a monitored article is located.

Yet another object of the invention is to enable detection of monitored articles, which are being transferred into and out of the detection zone, respectively, as well as between sectors within the detection zone.

These objects are achieved by an article surveillance system with features according to the characterizing portion of the appended independent patent claims. Preferred embodiments of the invention are defined in the subsequent dependent claims.

BRIEF DESCRIPTION OF THE DRAWINGS

The invention will be described in more detail in the following, reference being made to the accompanying drawings, in which FIG. 1 schematically illustrates a block diagram for an article surveillance system according to the present invention.

DETAILED DISCLOSURE OF THE INVENTION

Figure 1:
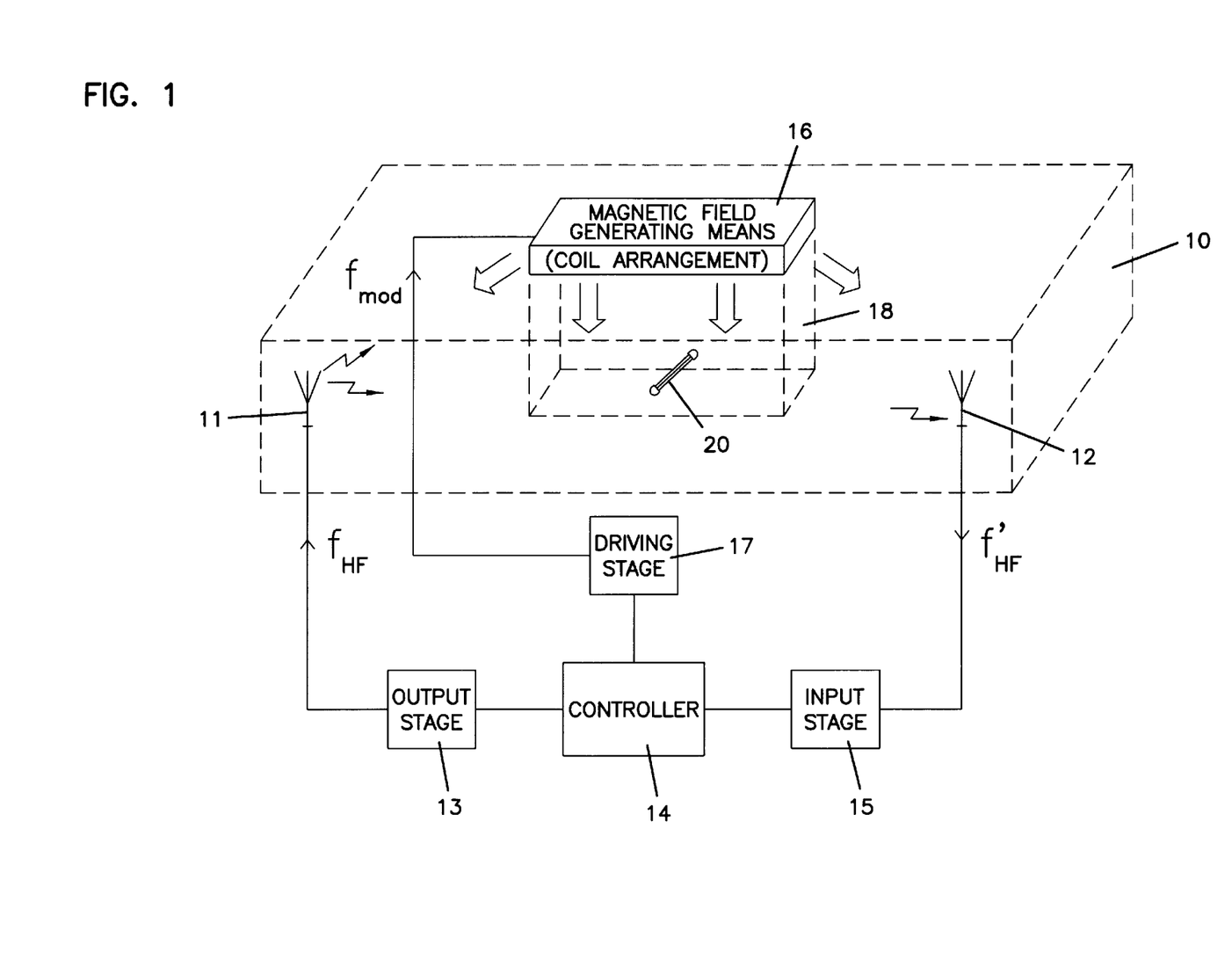

FIG. 1 discloses a schematic block diagram illustrating an article surveillance system according to the present invention. For exemplifying reasons the article surveillance system will throughout the description below be described as an antipilferage system to be used in a shop. However, it should be obvious to any person reading the detailed description below, that the article surveillance system according to the invention may be used also for other purposes than pure antipilferage applications.

The reference numeral 10 represents a part of any given shop, which is located close to the shop exit. Before an exemplary customer steps into the exit area 10 on his way out of the shop, he has already passed some type of cash-desk arrangement, where he is supposed to pay for all the articles picked during his tour around the shop. For the purpose of checking that each customer actually has duly paid for all his articles, at least some, or even all, articles available in the shop assortment are provided with a respective transponder-type sensor 20, which will be disclosed in more detail below. When an article is paid for, the sensor 20 is removed or deactivated at the cash-desk by conventional means. Any sensor 20 not being removed or deactivated will be detected by the article surveillance system according to the invention in a way described below. For clarifying reasons neither the article, on which the sensor 20 is mounted, nor the person, who is making an illegal attempt to carry the article out of the shop without paying for it, have been indicated in FIG. 1.

A transmitter antenna 11 and a receiver antenna 12 are arranged in the exit area 10. The transmitter antenna 11 is operatively connected to an output stage 13, which in turn is connected to a controller 14. The output stage 13 comprises various conventional driving and amplifying circuits as well as means for generating a high-frequency electric current $i_{HF}$, which will flow in alternating directions through the transmitter antenna 11 when supplied thereto, thereby generating high-frequency electromagnetic signals with a frequency $f_{HF}$ in a well-known fashion around the transmitter antenna, which are transported in different directions away from the antenna by propagation of waves. As described in more detail below, these electromagnetic signals are used for exciting a transponder or sensor 20 present in the exit area 10, said transponder or sensor transmitting an electromagnetic reply signal when receiving electromagnetic energy from the transmitter antenna 11, and said electromagnetic reply signal being received by the receiver antenna 12. Preferably, the frequency $f_{HF}$ are selected within the radiofrequent interval between, for instance, 100 MHz and 2 GHz.

The receiver antenna 12 is operatively connected to an input stage 15, comprising conventional amplifying and signal-processing means, such as band-pass filter and amplifier circuits. Furthermore, the input stage 15 is connected to the controller 14 and is arranged to forward a signal, which has been received and processed as described below, to said controller 14.

Hence, the transmitter antenna 11 as well as the receiver antenna 12 are arranged for conventional conversion between an electric high-frequency signal and an electromagnetic one. The antennas are for instance formed as conventional end-fed or center-fed half-wave whip antennas, but other types of conventional antennas are equally possible. Also the more advanced antenna types may be used, which for instance are capable of generating electromagnetic fields with rotating or plane polarity, thereby giving an opportunity to control problems of a practical nature, such as reflection, absorption or directional dependency for the sensors in the exit area. Furthermore, more than one transmitter antenna 11 and receiver antenna 12, respectively, may be used.

Additionally, the controller 14 is operatively connected to at least one alarm device (not disclosed in FIG. 1), by means of which a conventional alarm signal may be generated visually and/or acoustically, whenever the presence of a sensor 20 has been detected as described below. The controller may be realized in hardware alone, but since the signal analyses described below may be carried out in software, i.e. as one or more than one computer program executed in the controller, some kind of computer is preferably used. Thus, in the following the controller is assumed to be a conventional personal computer, which has been provided with interfaces necessary for the communication with other units in the article surveillance system.

Furthermore, a magnetic field-generating means 16 is arranged in the exit area 10, said means preferably being formed as a coil arrangement just below the ceiling level, or between ceiling and roof. This arrangement has the aesthetic advantage of making the entire coil arrangement 16 less noticeable or even invisible to the shop customers and thus providing a higher degree of freedom when designing the shop exit aesthetically appealing. The coil arrangement in the article surveillance system according to the invention is thus horizontally arranged in contrast to the conventional systems described above, where the detection arcs are vertically arranged.

According to a basic embodiment of the invention the magnetic field-generating means 16 consists of an electric conductor, such as a copper wire, which is wound in one turn or a plurality of turns around a coil frame. Preferably, the coil arrangement is essentially shaped as a rectangle, which is large enough to expose the entire part of the exit area 10, which is to be monitored for passing customers, to a magnetic modulation field described below. According to one embodiment of the invention the coil arrangement may consist of a plurality of coils arranged next to each other, optionally with a certain degree of overlapping with respect to each other, as described below. The dimensions of the coil arrangement with respect to the length and width thereof are in the order of a few meters, thereby obtaining a minimum of field strength variations between different positions within the detection zone, which is advantageous for reasons of health and which leads to minimum differences in the signal strength received at different positions in the detection zone. The volume 18 essentially directly below the coil arrangement 16 forms the detection zone of the system, i.e. the zone which a customer will also pass through when leaving the shop.

Thanks to the invention a large but still well-defined detection zone is possible (several meters wide combined with a transition area between the states "inside" and "outside", respectively, of a few decimeters only), as described below. The shop exit area 10 must of course be designed in such a way that the risk is minimized of having a customer passing out of the shop through another way, deliberately or not, than below the coil arrangement 16 and through the detection zone 18.

The coil arrangement 16 is connected to the controller 14 through a driving stage 17. The driving stage 17 comprises means for generating a low-frequency modulating current $i_{mod}$, which is fed through the coil for generating a low-frequency magnetic modulation field $H_{mod}$ around the coil, the propagation of which covers the entire detection zone but also some areas outside this zone, which is more or less inevitable. The modulating current is given a known variation in amplitude as a function of time according to the generic formula $i_{mod}(t)=f(t)$. In its most basic form the modulating current corresponds to a pure sine waveform according to $$i_{mod}(t)=A\sin(2\pi f_{mod}t),$$

where A as usual represents the amplitude of the current and $f_{mod}$ represents the frequency thereof, but other more complicated mathematic functions are also possible.

When an electric current i is fed through a straight electric conductor, a magnetic field is generated, the field strength H of which is linearly dependent upon this current according to $H=i/2\pi r$, where r represents the distance to the conductor, and hence the magnetic modulation field $H_{mod}$ generated as described above will vary according to the modulating current $i_{mod}$. The frequency for $H_{mod}$ may for instance be selected in the interval 100–1000 Hz.

In the article surveillance system according to the invention every sensor 20 has such characteristics, that the electromagnetic radio-frequency reply signal from the sensor may be controlled or modulated by the magnetic modulation field generated by the coil arrangement 16. How to obtain such controllable characteristics in practice is thoroughly described in the Swedish patent application 9600528-5 previously filed by the present applicant and entitled "Sensor for remote detection of objects", which has not been published yet, and in the following the sensor is assumed to be of the kind disclosed in said patent application, for exemplifying but not limiting purposes. Other types of sensors may be used, as long as they fulfil the functional demands described below.

According to the patent application above each sensor is provided with a preferably wire-shaped element of an amorphous material with magnetic properties. A suitable material for this wire-shaped element is for instance one of the amorphous alloys $Co_{68.1}Fe_{4.4}Si_{12.5}B_{15}$ or $Co_{70.5}Fe_{4.5}Si_{15}B_{10}$, both of which have a major fraction of cobalt. The element is arranged in a dielectric environment, for instance inside a glasstube filled with a liquid, and the element is acting as a receiver antenna for incoming electromagnetic signals as well as a transmitter antenna for transmitting electromagnetic reply signals. The material properties of the wire-shaped elements are such, that the permeability gr thereof depends on the magnetizing field strength along the main direction of the element in a way, which now will be closer described.

Figure 2:
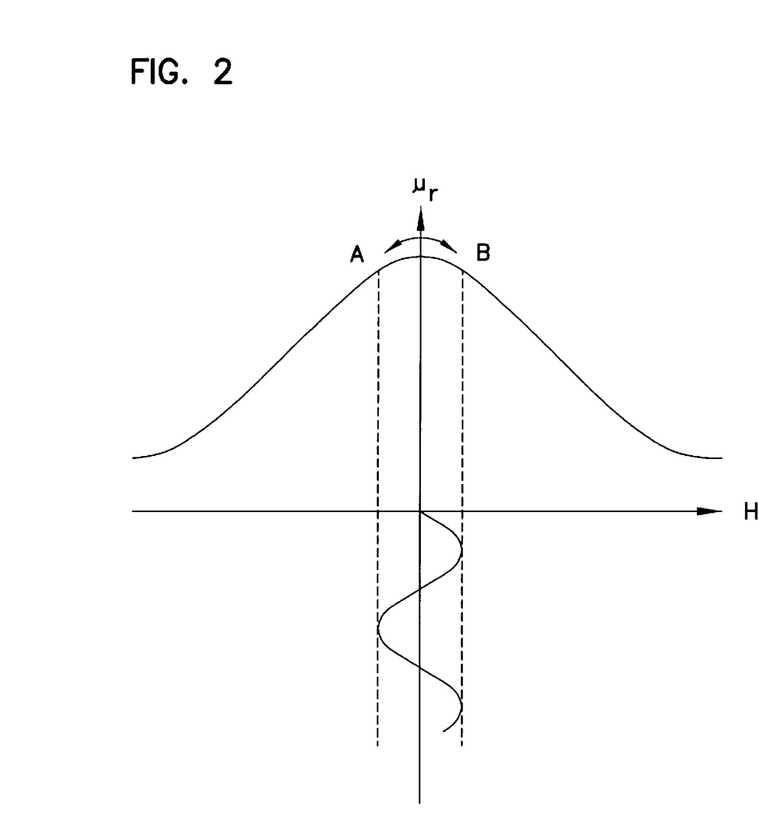
FIGS. 2 and 3 are diagrams illustrating a physical effect, which is used according to an embodiment of the invention, FIGS. 4 and 5 schematically illustrate the propagation of a magnetic modulation field according to the invention.
Figure 3:
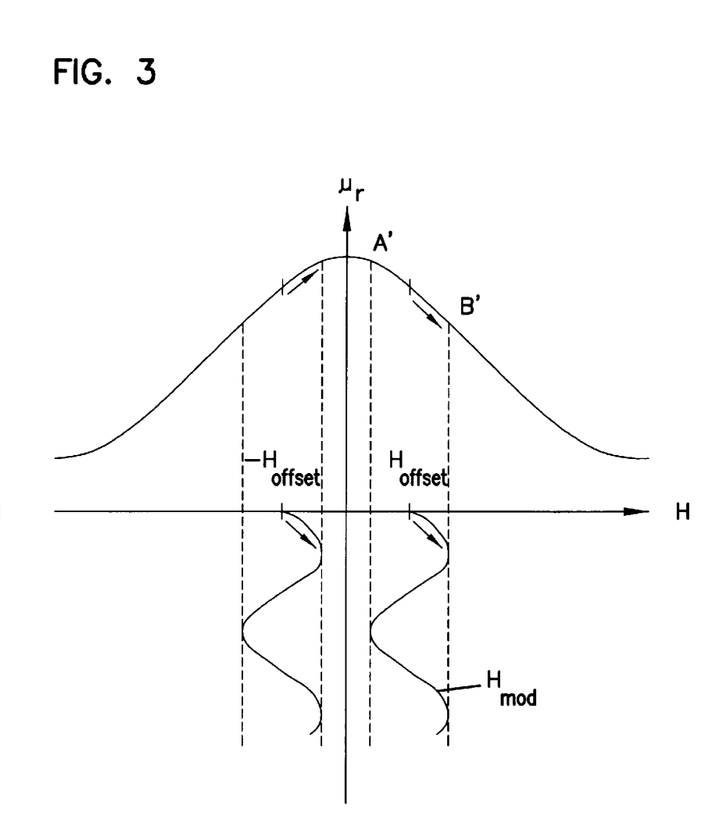

FIG. 2 graphically illustrates how the permeability gr of a material according to the above depends on the magnetizing field strength H of the magnetic modulation field. In the lower portion of the diagram the sine wave variations of the latter is indicated. This variation causes the instantaneous value of $\mu_r$ to be transferred, so to speak, along the graph between points A and B due to the variations in the modulating field. However, since the graph is symmetric with respect to the y-axis (i.e., $\mu_r$ is a function of $|H|$), $\mu_r$ varies twice as fast as H. By adding a constant offset-component $H_{offset}$ to the modulation field $h_{mod}$ according to FIG. 3, $\mu_r$ is caused to vary between the values A' and B' at the same frequency as the modulating field. The offset-component $H_{offset}$ may be generated by adding a DC-component to the modulating current $i_{mod}$. Alternatively, $H_{offset}$ may be represented by the magnetic field from the earth, which is always present.

The controllable permeability described above is used for generating an amplitude-modulated reply signal from each sensor 20. The electric impedance of the element depends on the permeability $\mu_r$ of the element material through the so-called giant magnetoimpedance effect in the wire-shaped element, and since the permeability in accordance with the above varies together with the magnetic modulation field, also the amplitude of the reply signal from the sensor will vary with the same frequency.

At each moment the modulating field has a certain vertical direction inside the detection zone 18 (i.e. straight below the coil arrangement 16), but an opposite direction almost immediately outside the coil arrangement, and according to one embodiment of the invention this fact is utilized to make it possible to determine, when detecting a sensor 20, whether the sensor is located inside the detection zone 18 (thus motivating the generation of an alarm), or outside the zone (where an alarm should not be generated in order to avoid the risk of having a false alarm). By investigating the graph in FIG. 3 one realizes why this is possible, as described below.

The offset-component $H_{offset}$ and the modulating field $H_{mod}$ are assumed to have identical and essentially vertical orientation downwards inside the detection zone 18. The resulting modulating magnetic field is represented by the graph in the lower rightmost portion of the drawing, which varies as a sine function around the value $H_{offset}$. When the field strength of the magnetic field increases from its average value to its maximum value, which has been indicated by an arrow in FIG. 3, the permeability $\mu_r$ will decrease from its average value towards the minimum value B', which also has been indicated by an arrow, and will then again start to increase and follow the variations in the magnetic field according to a sine wave, as described above. On the other hand, $H_{offset}$ and $H_{mod}$ have opposite directions outside the detection zone 18, which may be viewed upon as the $H_{offset}$ value now being negative ($-H_{offset}$ in the leftmost portion of FIG. 3). It appears that when the leftmost sine graph—in correspondence with the description for the rightmost graph—increases towards its maximum value, $\mu_r$ will initially increase, i.e. the sine wave variations in permeability starts in a different phase than for the rightmost graph. The sine wave variations in permeability (and hence also the variations in the amplitude of the reply signal from the sensor) are consequently offset in phase by 180° with respect to each other, depending on whether the sensor is located inside or outside the zone 18.

After having demodulated the received sensor signal in the input stage 15 as described below, the relative phase (between the modulating current $i_{mod}$ and a demodulated reply signal $i_{demod}$ may be used as a detection criterion:

$\phi=0°\rightarrow$the sensor is located inside the detection zone 18, $\phi=180°\rightarrow$the sensor is located outside the detection zone 18.

Figure 4:
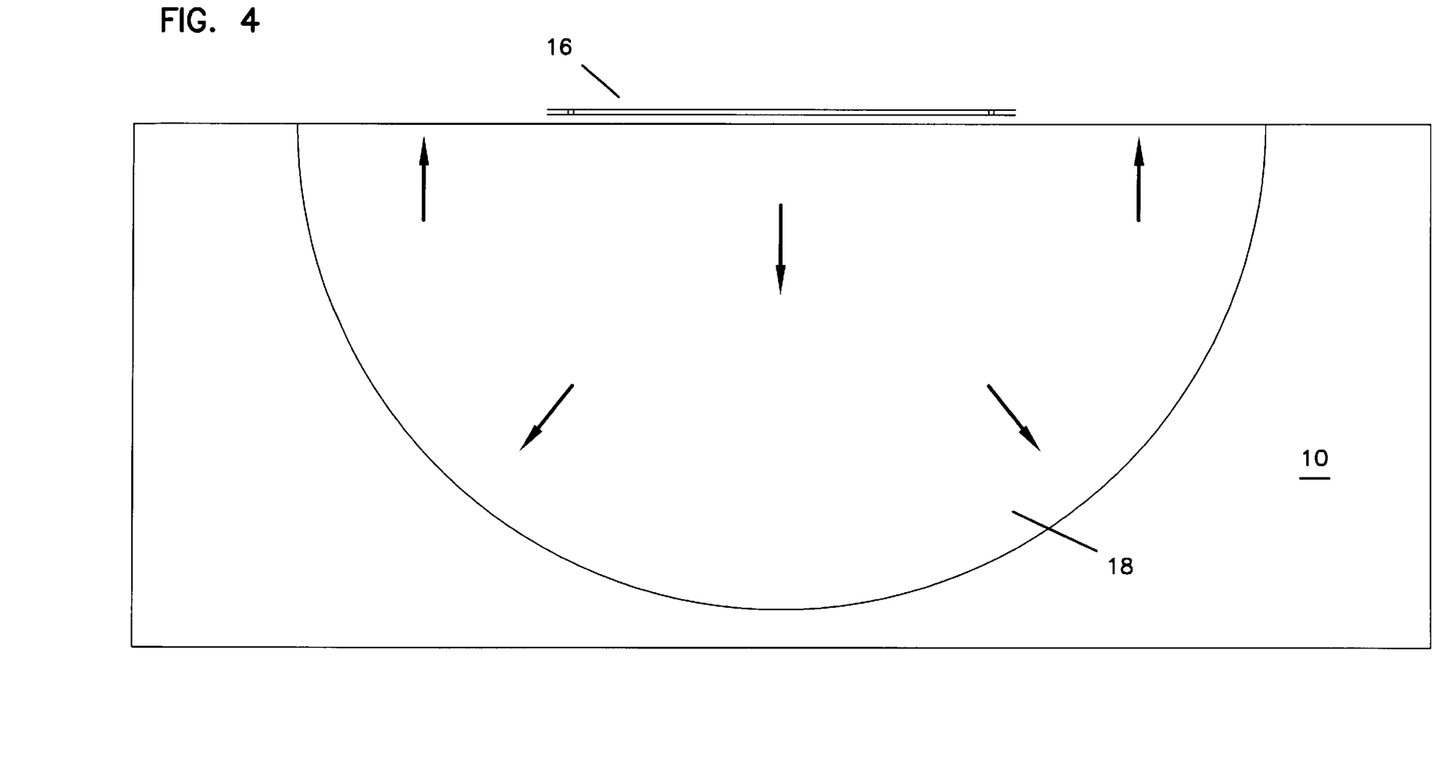

FIG. 4 schematically illustrates the direction of the field vector of the magnetic modulating field at a certain moment of time. Apparently, the field vector in a certain position inside the detection zone (straight below the coil arrangement 16, which is illustrated in cross-section) is substantially directed along a vertical direction downwards, while the field vector for any given position outside the detection zone 18 is instead substantially directed upwards.

Figure 5:
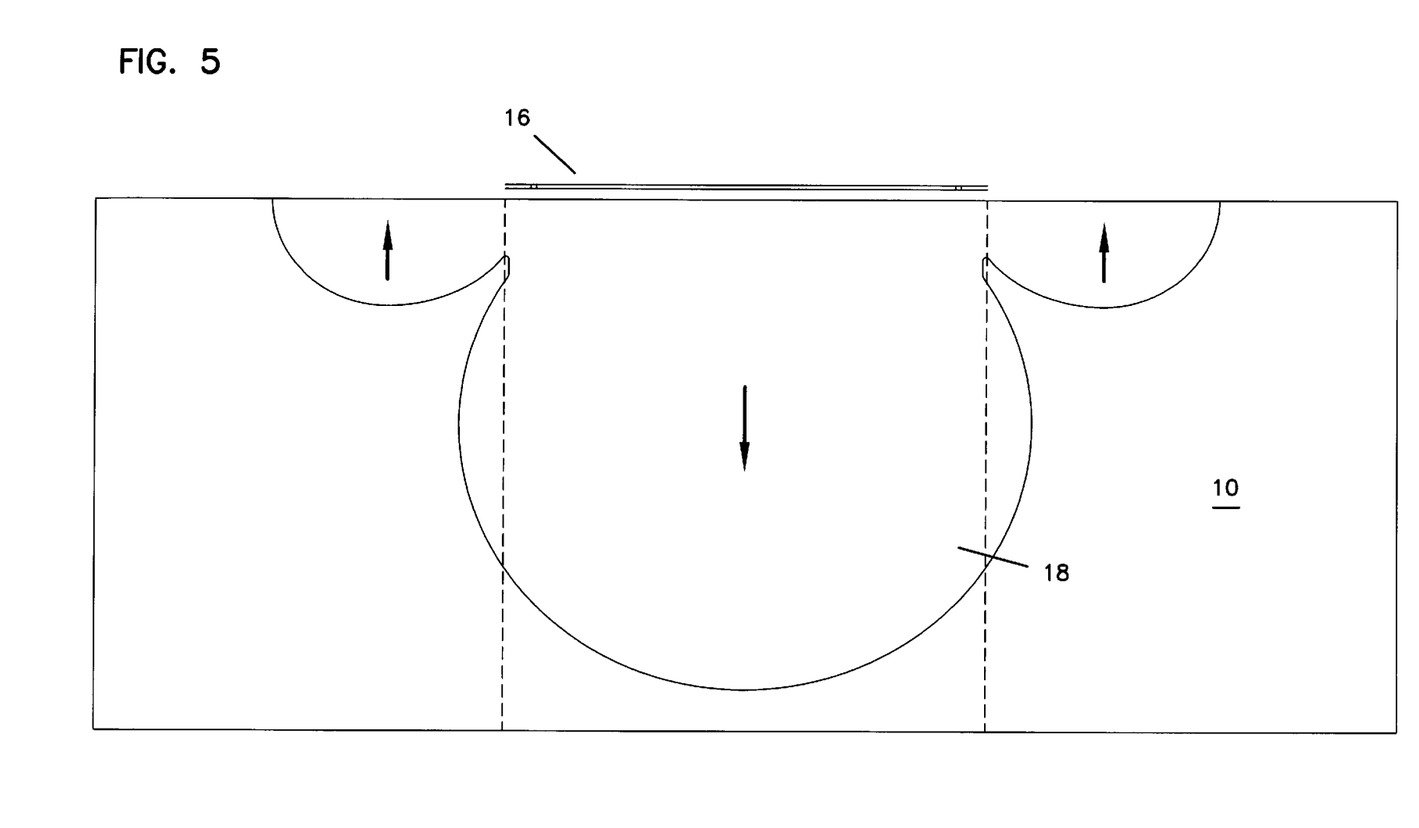

FIG. 5 illustrates the z-component, i.e. the vertical component, of the field vectors in FIG. 4. A large main lobe, where the z-component is directed downwards, covers essentially the entire detection zone 18, while sidelobes comprising z-components directed upwards are present outside the detection zone.

Figure 6:
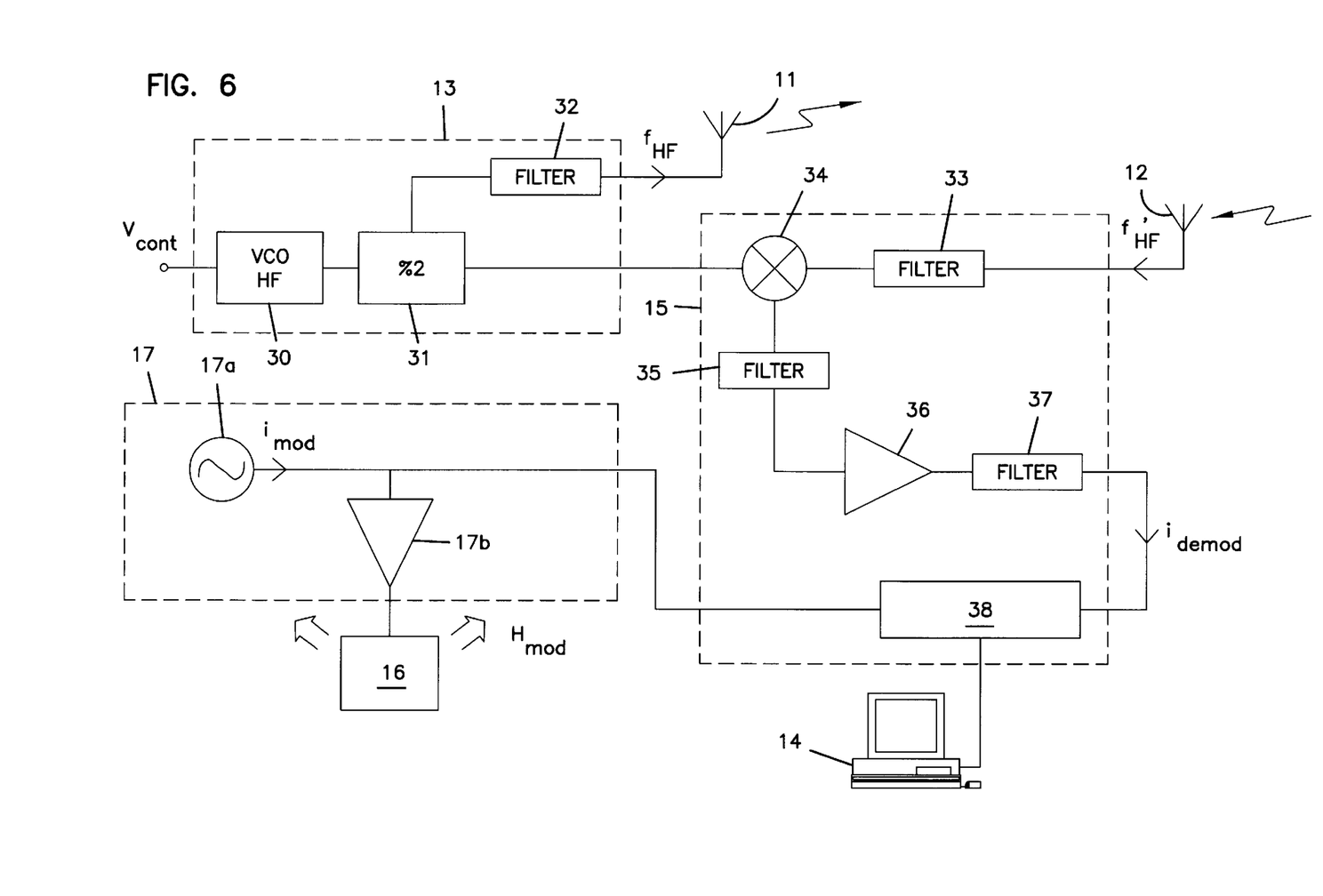
FIG. 6 is a block diagram illustrating an electric circuitry, which is used in one embodiment of the invention.

A possible way of realizing the functions of the article surveillance system described above will now be described with reference to the block diagram in FIG. 6. Then a more detailed analysis of the particular method of detection will follow with reference to FIG. 7.

A voltage-controlled oscillator (VCO) 30 is controlled through a DC voltage $V_{cont}$ for generating a high-frequency signal in a well-known manner. The frequency of the high-frequency signal is for practical reasons divided down to half of the original frequency by means of a divider circuit 31, and then the signal is bandpass filtered around the carrier frequency $f_{HF}$ by means of a filter 32 to be supplied to the transmitter antenna 11. A radio-frequency reply signal transmitted from a sensor 20 is received in the receiver antenna 12, filtered by means of a bandpass filter 33 and supplied to an input of a mixer circuit 34. The mixer circuit 34 receives at a second input the output signal from the divider circuit 33 and amplitude-demodulates the high-frequency signal received in the receiver antenna 12. The signal thus demodulated is filtered by means of a filter circuit 35, before it is supplied to an amplifier 36 and a lowpass filter 37.

At the same time the controller 14 controls the coil arrangement 16 through the driving stage 17 for generating a low-frequency magnetic modulating field, as described above. Here, the driving stage 17 comprises a sine wave generator 17a as well as a power amplifier 17b, and the modulating current $i_{mod}$ supplied by the generator 17a is also supplied to a first input of a synchronous demodulator circuit 38, which at a second input thereof receives the receiver signal $i_{demod}$, which according to the above has been amplitude-demodulated as well as amplified and filtered. The synchronous demodulator circuit 38 is, as described below, arranged to mix the two input signals and to lowpass filter the resulting signal, wherein a DC component is obtained, the sign of which (positive or negative) may be used to determine whether a given sensor is located inside the detection zone 18 or outside the zone, as described below.

Figure 7:
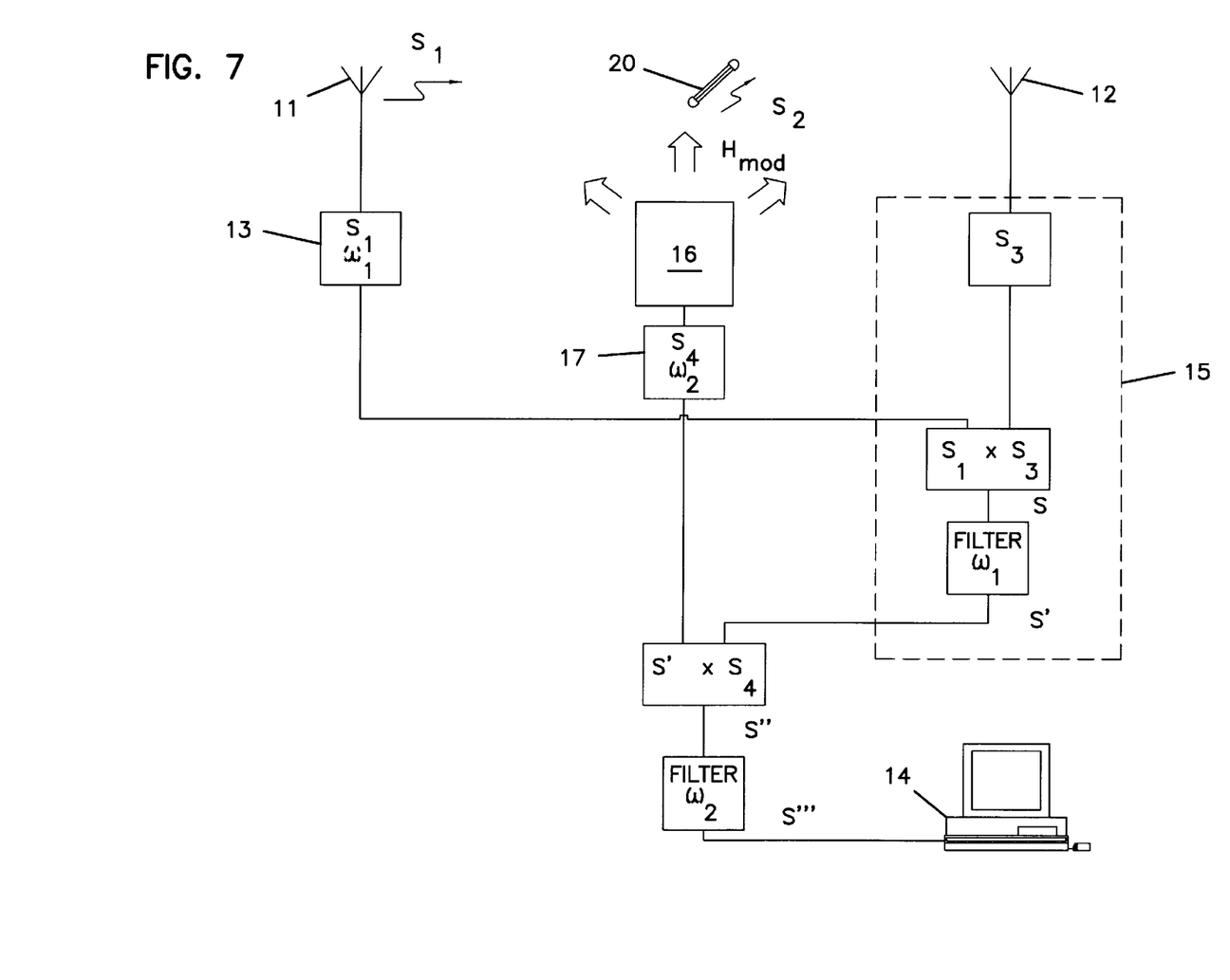
FIG. 7 is a block diagram schematically illustrating the operation according to an embodiment of the present invention.

Now, the method of detection will be closer described with reference to FIG. 7, wherein the components described above are given the same reference numerals as in previous parts. The following signals are present in the system according to FIG. 7:

$S_1=A_1\cos((\omega_1 t)$ is the transmitted high-frequency signal (the carrier wave), $S_2=A_2\cos(\omega_2 t)\cdot\cos((\omega_1 t+\phi_1)$ is the amplitude-modulated reply signal from the sensor, $S_3=A_1'\cos(\omega_1 t+\phi_2)+A_2'\cos(\omega_2 t)\cdot\cos(\omega_1 t+\phi_1)$ is the received signal, which contains components originating from the transmitted high-frequency carrier signal as well as the modulated reply signal, and $S_4=A_3\cos(\omega_2 t)$ is the low-frequency signal for generating the magnetic modulating field.

According to the above the signals $S_1$ and $S_3$ are mixed in the input stage 15, thereby obtaining the signal S according to:

$$S=S_1\times S_3=A_1A_1'\cos(\omega_1 t)\cos(\omega_1 t+\phi_2)+A_1A_2'\cos(\omega_1 t)\cos(\omega_2 t)\cos(\omega_1 t+\phi_1)=\tfrac{1}{2}A_1A_1'[\cos(2\omega_1 t+\phi_2)+\cos(\phi_2)]+\tfrac{1}{2}A_1A_2'\cos(\omega_2 t)[\cos(2\omega_1 t+\phi_1)+\cos(\phi_1)]$$

After filtering $\omega_1$ as well as its harmonics the following expression is obtained:

$$S'=\tfrac{1}{2}A_1A_1'\cos(\phi_2)+\tfrac{1}{2}A_1A_2'\cos(\omega_2 t)\cos(\phi_1)$$

In the equation above $\cos(\phi_1)$ and $\cos(\phi_2)$ are dependent upon the sensor position in relation to the antennas. Obviously, the second term is a function of $\omega_2$, i.e. the (angular) frequency of the modulating current. The synchronous demodulation is now effected by mixing $S_1'$ and $S_4$:

$$S''=S_1'\times S_4=\tfrac{1}{2}A_1A_1'A_3\cos(\phi_2)\cos(\omega_2 t)+\tfrac{1}{2}A_1A_2'A_3\cos(\phi_1)\cos(\omega_2 t)\cos(\omega_2 t)==\tfrac{1}{2}A_1A_1'A_3\cos(\phi_2)\cos(\omega_2 t)+\tfrac{1}{2}A_1A_2'A_3\cos(\phi_1)\cos(2\omega_2 t)+\tfrac{1}{2}A_1A_2'A_3\cos(\phi_1),$$

which when filtered yields:

$$S^{(3)}=\tfrac{1}{2}A_1A_2'A_3\cos(\phi_1)$$

The value of this DC component is continuously analyzed by the controller 14, which may obtain several conclusions from this value. For instance, if no sensors 20 at all are present in the exit area 10, then $A_2'=0$, wherein the value of $S^{(3)}=0$ too. Consequently, as long as $S^{(3)}=0$, there is no reason for alarm. On the other hand, whenever $S^{(3)}$ reaches a predetermined threshold value $\neq 0$, the presence of at least one sensor is indicated. Thanks to the directional dependency of the modulating field described above, the factor $A_3$ will be positive or negative, respectively, depending on whether the sensor is located inside the detection zone or outside said zone, hence making the sign of $S^{(3)}$ an appropriate alarm condition. The detection security inherent in this system may be increased by requiring the value of $S^{(3)}$ to deviate from zero during a time period long enough and/or by a margin large enough. The security may be further improved through the enhanced embodiments of the system described below.

As an alternative to the synchronous demodulation described above another appropriate type of signal processing may be used for determining the presence of the sensor within the detection zone. Conventional frequency analysis, such as FFT or DFT, seems particularly suitable.

According to one embodiment of the invention the detection zone 18 may be sectorized in different sectors in order to facilitate the individual detection of a plurality of sensors, which all are simultaneously present in different parts of the detection zone. Such a procedure is highly desired, if the shop in question is provided with a wide exit of, for instance, 5–15 meters. Several customers may pass through such an exit simultaneously, and whenever any of these customers carries an article provided with a sensor, a system corresponding to the basic embodiment described above will detect the presence of the sensor and give an alarm. Then a most unpleasant situation emerges for the rest of the customers in the detection zone, since which one of the customers who has committed the attempted theft is not immediately obvious.

Figure 8:
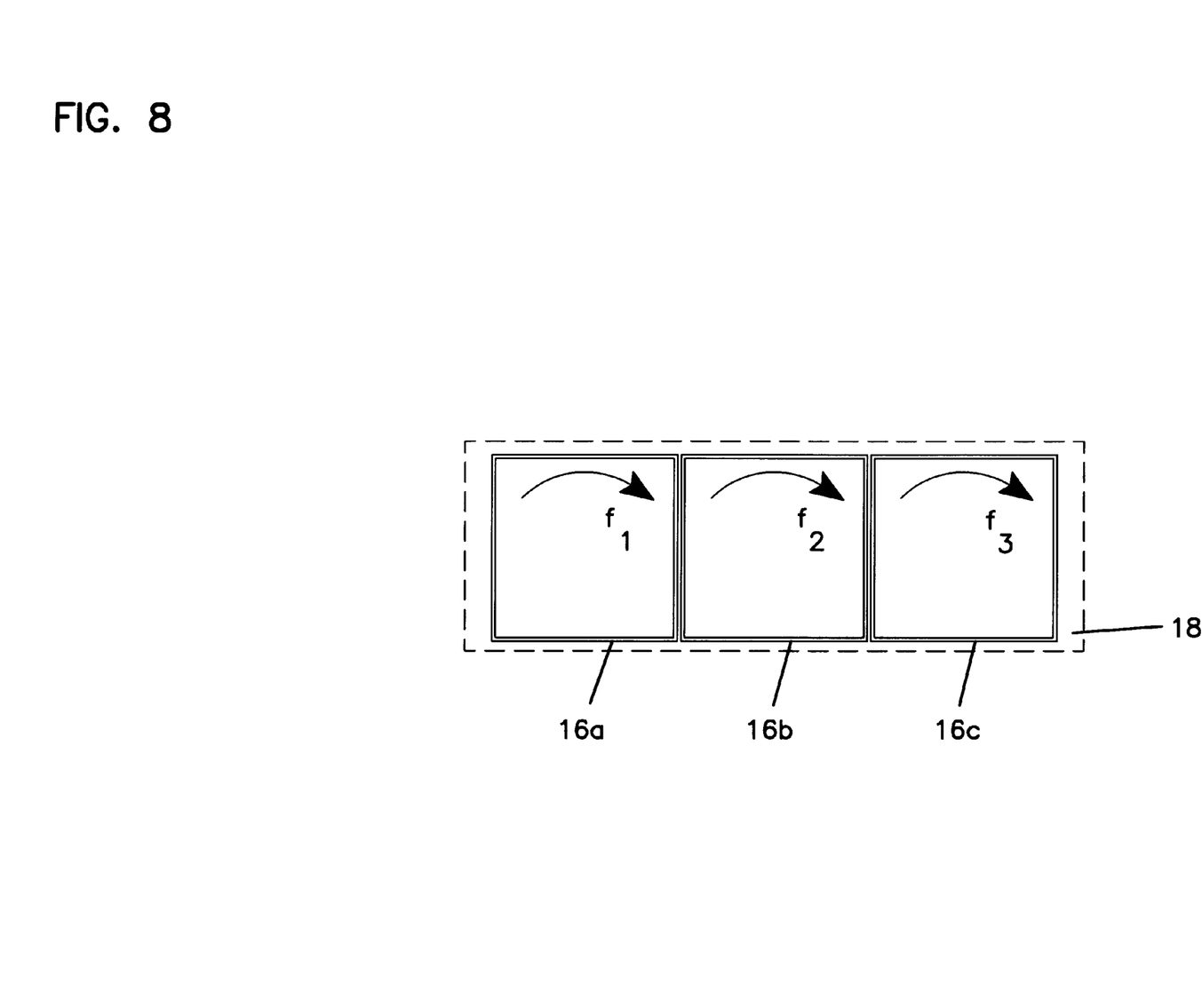
FIG. 8 is a schematic topview of a coil arrangement according to an embodiment of the invention.

Such undesired situations may be avoided by partitioning the detection zone in different sectors invisible to the human eye according to FIG. 8. FIG. 8 schematically illustrates a wide detection zone 18, corresponding to a shop exit viewed from the above. The walking direction of the customers is to the "north", i.e. from the bottom to the top in the drawing. Here, the magnetic field-generating means 16 is represented by a coil arrangement consisting of a plurality of coils 16a, 16b, 6c, said coils being arranged side by side, thereby covering the entire detection zone 18. Similar to the case above each coil is operatively connected to the controller 14, which controls the operation of the coil arrangement, so that the first coil 16a generates a magnetic modulating field at a first frequency $f_1$, the next coil 16b operates at a second frequency $f_2$, etc. Once a received reply signal has been demodulated, the controller may determine the sector, in which the sensor in question is located, by means of the frequency contents of the demodulated signal. While a sensor present in a certain sector will be influenced also by the magnetic modulating fields originating from the surrounding sectors, the received and demodulated reply signal will be stronger at the "correct" frequency (for instance $f_1$, if the sensor is located in the first sector), due to the field strength being dependent upon the distance. The determined sector may then be indicated as desired, for instance by activating a lamp arranged in the ceiling above the sector in question. Furthermore, it is possible to detect the relatively unusual situation, where two customers are carrying a respective protected article at the same time through a respective sector, since each sensor will reveal its existance through a respective frequency component in the received and demodulated signal.

Instead of constantly driving each coil arrangement at its own frequency, as described above, an alternating driving schedule is possible as an alternative. In that case the controller 14 will control the different coil arrangements in such a way, that the first coil arrangement is active, i.e. generates a magnetic modulating field, during a first time interval $\Delta t_1$, while the remaining coil arrangements are inactive. During a subsequent time interval $\Delta t_2$ the next coil arrangement will be active, and so on. The procedure is continuously repeated, and the time intervals may essentially be chosen arbitrarily short, with the restriction, however, that a sufficient number of modulating cycles must lapse during each time period. Time intervals of approximately 10–100 ms have proven suitable for a modulating frequency of about 500 Hz. The controller may then determine the correct sector for a reply signal received from a sensor 20 somewhere in the detection zone 18 by registering the particular time period ($\Delta t_1, \Delta t_2, \ldots$), during which the signal was received.

Figure 9:
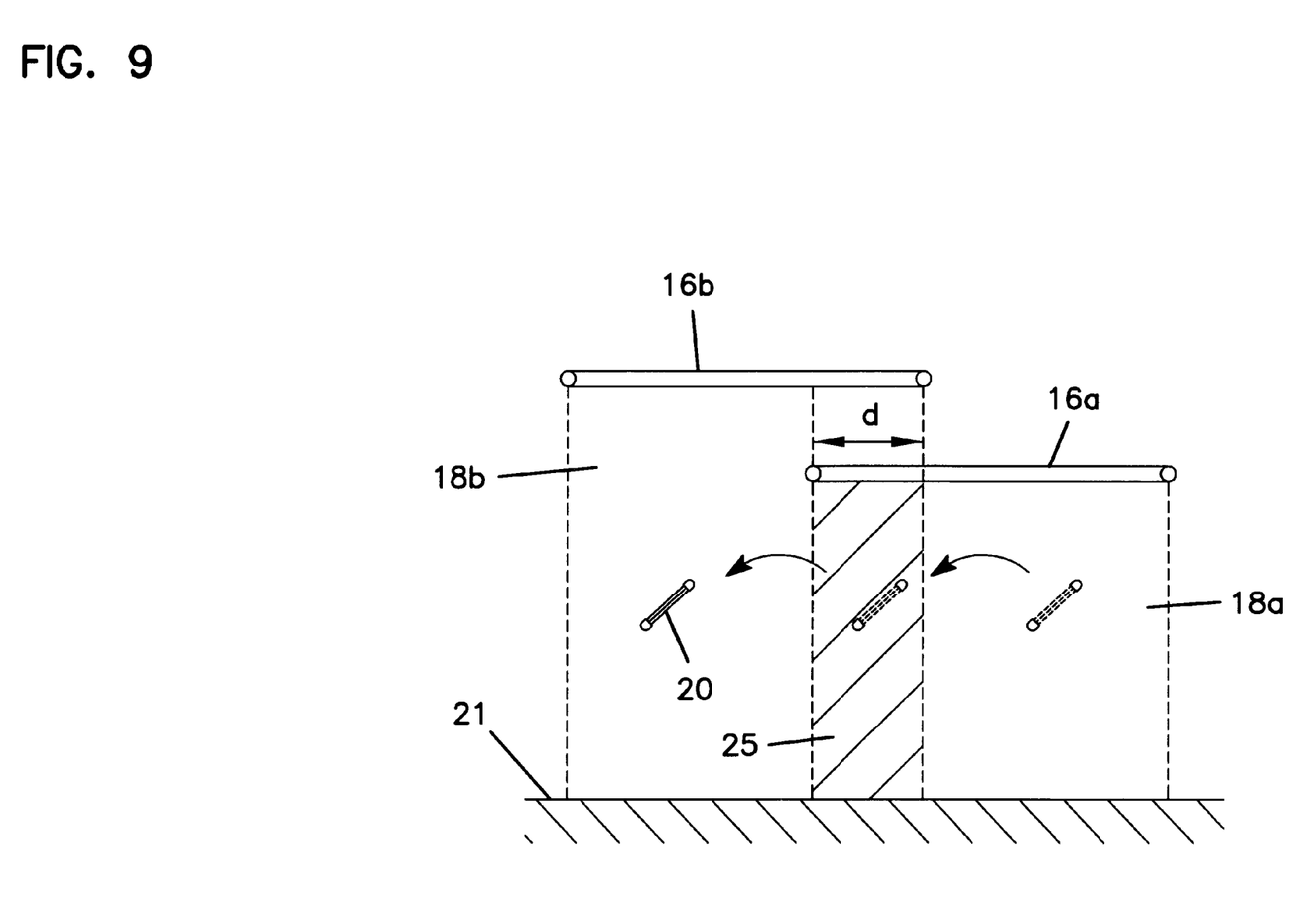
FIG. 9 is a schematic sideview of a coil arrangement according to another embodiment of the invention.

According to another embodiment of the invention different sectors are arranged at a certain degree of overlapping in relation to each other, as shown for instance in FIG. 9. Such an arrangement has the considerable advantage of allowing a substantially narrower detection zone (with respect to the walking direction for customers passing out through the shop) as described below, thereby reducing the risk of false alarms. Furthermore, the arrangement provides the information received and available to the controller 14 with one additional dimension of information. This new dimension is the position history of the current sensor, i.e. the controller will now have the opportunity to detect the direction of the transfer of a sensor between different sectors within the detection zone.

Figure 10:
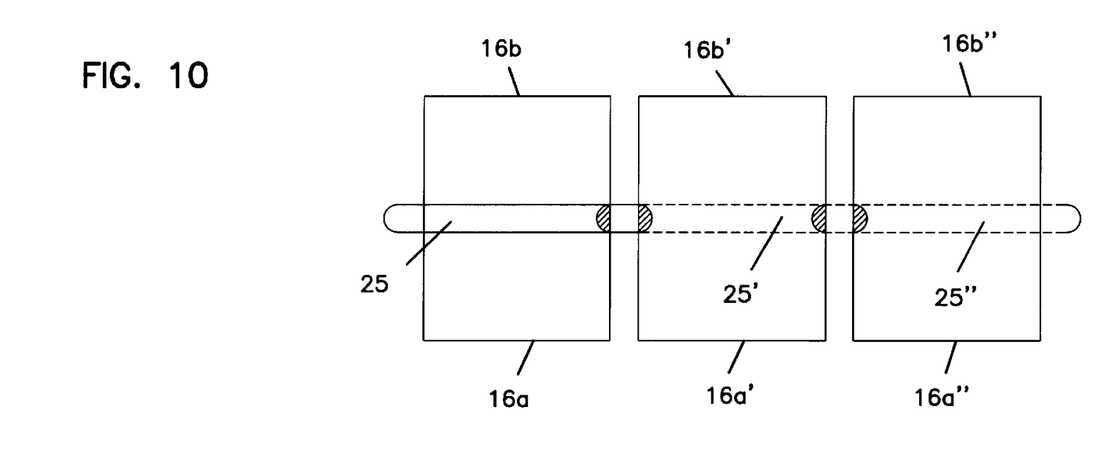
FIG 10 is a schematic topview of the coil arrangement according to FIG. 9.

In FIG. 9 a detection zone 18a, 18b, corresponding to a portion of a shop exit, is schematically illustrated as a side view. Two coils 16a, 16b, which are a part of the coil arrangement 16, are arranged at a certain height above a ground plane 21, such as the floor in the shop. As appears from FIG. 9, one coil 16a is arranged slightly above the other coil 16b with a partial overlapping d with respect to the first coil. Note that the situation in FIG. 9 is of a schematic nature only, and hence the relation in size between d and the coils 16a, 16b, respectively, should not be regarded relevant. The two coils are arranged, so that a customer passing out through the shop exit will first pass through the detection sector 18a belonging to the first coil 16a, then through the overlapping zone 25 and finally through the detection sector 18b belonging to the second coil 16b, i.e. in a direction from right to left in FIG. 9. Consequently, the coils 16a, 16b are here arranged behind each other (in relation to the travelling direction of the customer) in the detection zone, in contrast to the situation in FIG. 8, where the different coils are preferably arranged beside each other. Within the scope of the invention these different alternatives may be combined, however, so that the detection zone may be sectorized in its longitudinal direction as well as its transversal direction, as is schematically illustrated in FIG. 10.

By alternately driving one of the coils, while the other is inactive, it is possible, as previously described, to detect the particular sector, in which the sensor 20 is located for the moment. Thanks to the overlapping of the coils a considerably increased detection accuracy is available in accordance with the explanatory example below.

Assume that an article, which has been provided with a sensor 20, is being transferred out from the shop by a less scrupulous individual. First, the sensor 20 will reach the position to the right in FIG. 9, that is inside the detection sector 18a. During the short period of time, when the coil 16a is active, the controller will detect the presence of the sensor inside sector 18a, which is represented by the character "+". Then the coil 16b is active, wherein the controller may determine that the sensor is located outside sector 18b, which is represented by the character "−". Since the procedure is continuously repeated, the situation may be described as a sequence of state-pairs detected by the controller 14:

"+− +− +− +− +− +− +− . . . "

When the sensor reaches the overlapping zone 25, the presence of the sensor inside sector 18*a* will still be detected during the first half of the detection cycle, i.e. state "+⇆. However, the sensor is now also present inside sector 18*b*, giving the state "+" also during the second half of the detection cycle. Thus the following sequence is obtained:

"++ ++ ++ ++ ++ ++ ++ . . . "

Finally, when the sensor has passed through the entire overlapping zone 25 and is now located at the leftmost position in FIG. 9, the following sequence is obtained:

"−+ −+ −+ −+ −+ −+ −+ . . . "

Thus, by the coil arrangement and driving method described above it is possible to detect the transfer of a sensor 20 in the detection zone 18. Specifically, a considerably high degree of detection security is obtainable, since the alarm conditions may be chosen in such a way, that at least a few, or even all, of the above state sequences must have been detected, before an alarm signal is generated. Alternatively, a considerably reduced detection zone is possible by only requiring the state sequence "++ ++ ++ ++ . . . " before generating the alarm signal. In practice, the detection zone 18 has in such a case been reduced to the overlapping zone 25 only, which may be made very narrow, for instance a few decimeters. Still another advantage of having an overlapping arrangement is the elimination of the potential problem posed by the factor cos($\phi_1$) in the expression described above for the signal $S^{(3)}$. As previously described, $\phi_1$ depends on the position of the sensor in relation to the antennas 11 and 12. Since cos($\phi_1$) may take on positive as well as negative values, the basic embodiment described above may in some situations have problems when determining whether the sensor is present inside or outside the zone. However, this problem is eliminated by the differential operating method according to the arrangement described immediately above, i.e. the differences between (or the changes in) the various signal components are used as alarm conditions.

Instead of driving the coils alternatingly during short time intervals, it is equally possible to drive the coils simultaneously at different frequences (cf. the methods previously described), wherein the influences from the different coils on the reply signal are separated in the frequency domain rather than the time domain as a consequence.

According to another embodiment the coils are arranged as overlapping pairs, similar to the description above. Now, however, both coils in each coil pair are driven by modulating currents having the same frequency, but instead the relation between the amplitudes of the respective modulating currents varies with time, whereby the magnetic modulating field contribution from the respective coil will vary with time, too, for a given position in the detection zone. For instance, at a certain point of time the current amplitude in the first coil equals 0,2I, while the current amplitude in the second coil equals 0,8I. At another point in time the conditions are 0,4I and 0,6I, respectively, etc. Consequently, the sum of the current amplitudes is constant, while the distribution between the two coils varies with time. According to the above the magnetic field below the respective coil essentially has a vertical direction, while the field in a proximate area just outside the coil has a different and substantially horizontal direction. Hence, as long as a sensor is located below both of the coils (i.e., inside the overlapping zone), both magnetic field contributions have vertical directions. Even if the magnitude of each contribution varies in time, the sum of the two is always constant in accordance with the above, which means that a reply signal demodulated according to the above has a constant value.

However, when the sensor is moved outside the overlapping zone, so that the sensor is now located below one of the coils but outside the other one, the two magnetic field contributions no longer have the same direction. Hence, the field vector will now rotate back and forth, and the sensor will no longer experience a constant resulting magnetic field vector. A demodulated reply signal with a varying amplitude is obtained hereby. This may be described as a second, "superimposed" amplitude modulation of the reply signal from the sensor, wherein this amplitude modulation does not show, as long as the sensor is located within the overlapping zone, but will appear, as soon as the sensor leaves the overlapping zone. This fact is used when determining the sensor position in relation to the overlapping zone. A field picture as described above may for instance be obtained by driving one of the coils in the coil pair at a certain phase shift in relation to the other.

Some practical problems, which the present inventor has been faced with during the development procedure, will now be briefly discussed together with suggested solutions to these problems, as an end of the description of the invention and the various embodiments thereof.

A problem with a sectorized detection zone, where the different coils are driven at different frequencies, is that the magnetic field from one coil is induced to some extent in the adjacent coils, thereby causing a less well-defined sector definition. Furthermore, applicable rules for maximum permitted field strength in public premises must be considered. When using a plurality of frequencies the field strength at every frequency must be added together, and the total field strength thus obtained is not allowed to exceed a given maximum value, thereby naturally limiting the available field strength at each frequency, i.e. from each respective coil. Thus, for several reasons it is appropriate to minimize the number of frequencies in the system. One way of reducing the number of required frequencies by 50% is to drive one coil in a pair of coils at a certain frequency, while the adjacent coil in the pair is driven at the same frequency but with a phase shift of 90°. Since the driving signals will then be orthogonal, the above-mentioned problem is eliminated. Furthermore, fewer frequencies have the advantage of a more simple kind of driving electronics. By such driving of coil pairs with a certain difference in phase with respect to each other, a corresponding phase difference may be registered in the received reply signal, when a sensor passes between the two coils, which may be used for determining whether the sensor is present in one sector or the other.

In particular situations a further problem of ambiguity may rise in that the received and demodulated signal will contain a signal component, which cannot be attributed to a certain sector but, so to speak, matches more than one sector. Such a situation will occur, if the sensor has an orientation, where it in a certain position outside a given sector is exposed to a modulating field vector, which would have caused exactly the same reply signal, if the sensor would have been located inside an adjacent sector. The situation is illustrated in more detail in FIG. 10, disclosing a top view of a coil arrangement, comprising three adjacently arranged detection sectors. Each sector comprises a pair of coils 16a-b, 16a'-b' and 16a"-b", respectively. The two coils in each pair of coils are arranged at a certain overlapping in relation to each other, as described above, wherein an overlapping zone 25, 25', 25", respectively, is formed in a way similar to the above. As illustrated, each overlapping zone extends slightly outside the respective pair of coils, and the ambiguity problems mentioned above may occur in these extension areas. As described above, the magnetic modulation field is vertically directed in the central portion of the respective overlapping zone. In the extending portions, however, the field has an essentially horizontal direction.

Figure 11:
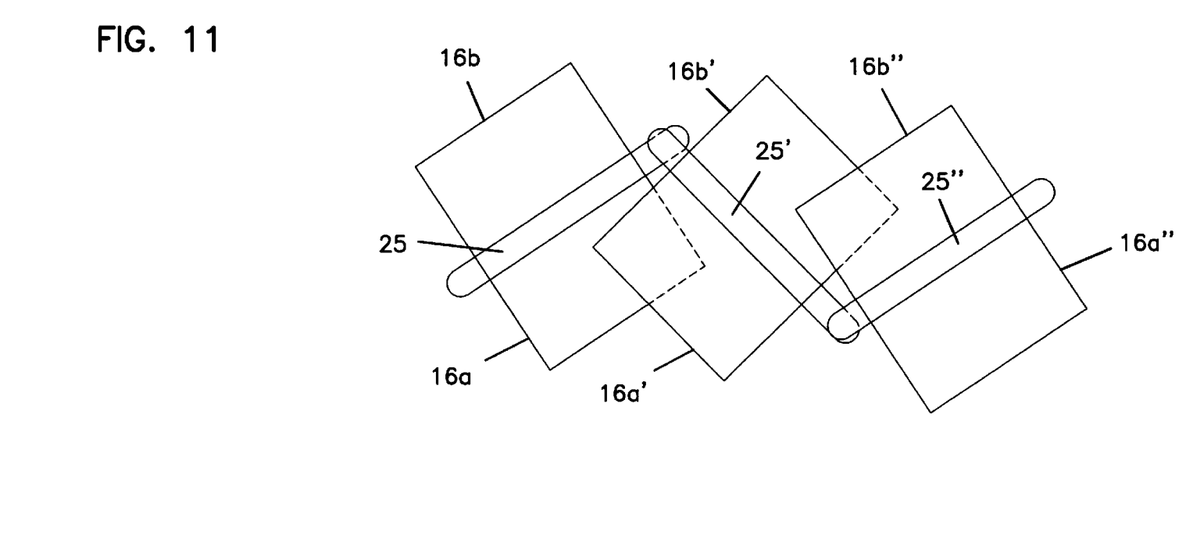
FIG. 11 is a schematic topview of a modification of the coil arrangement according to FIGS. 9 and 10.

Now, by imagining the experiment of keeping a sensor 20 in a vertical direction in the central portion of e.g. the overlapping zone 25', one will obtain the same reply signal, as if the sensor would have been kept in a horizontal direction in either of the extending portions of the overlapping zone 25'. Hence, ambiguity problems occur within the dashed areas in FIG. 10. These problems may be avoided by orienting adjacent sectors/pair of coils at a certain rotation with respect to each other in the horizontal plane, as described in FIG. 11, thereby avoiding a portion extending from a certain overlapping zone 25' to reach into the central portions of the adjacent overlapping zones 25 and 25", respectively.

The descriptions above for the preferred embodiments of the invention are to be regarded as embodiment examples only. Other embodiments may deviate from the ones described above within the scope of the invention, as defined in the appended patent claims.

In particular, it is to be understood that even if the coil arrangement 16; 16a, 16b, 16c; 16a-b, 16a'-b', 16a"-b" is described above as being arranged at a ceiling or roof level in the monitored premises, it is equally possible to arrange the coil arrangement at a ground level instead, the detection zone thereby being formed by an arbitrary volume essentially straight above the coil arrangement, instead of below the arrangement, as previously. Furthermore, it is possible to combine the alternatives above, i.e. to arrange coils above as well as below the detection zone. Such an arrangement would have the advantage of exhibiting magnetic modulation field(s) of essentially equal strength throughout the entire detection zone.

What is claimed is:

1. An article surveillance system for detecting the presence of articles in a detection zone, comprising at least one transmitter means and at least one receiver means for transmitting and receiving, respectively, electromagnetic radio-frequency signals in a detection zone, or in a proximity thereof, each article being provided with a sensor operating as a transponder for transmitting an electromagnetic radio-frequency reply signal to the receiver means when receiving a signal from the transmitter means, characterized by a coil arrangement with driving means for generating a low-frequency magnetic modulation field in the detection zone, and a controller (14) operatively connected to the transmitter means, the receiver means and the coil arrangement, wherein each sensor is arranged to transmit a reply signal, the amplitude of which is modulated by the magnetic modulation field, wherein the receiver means is arranged to receive and to demodulate the amplitude-modulated reply signal, and wherein the controller is arranged to supply modulating signals ($i_{mod}$) to the coil arrangement, receive demodulated signals ($i_{demod}$) from the receiver means and use the demodulated signals ($i_{demod}$) when determining the position of the sensor in relation to the detection zone.

2. An article surveillance system according to claim 1, characterized by the controller (14) being arranged to use information on the phase between the modulating and the demodulated signals ($i_{mod}$, $i_{demod}$) when determining the position of the sensor (20) in relation to the detection zone (18).

3. An article surveillance system according to claim 1, characterized by the controller (14) being operatively connected to an alarm device for visual and/or acoustic indication of the determined sensor position or any consequence thereof.

4. An article surveillance system according to claim 1, characterized by the coil arrangement (16) being horizontally arranged in parallel to a ground plane (21).

5. An article surveillance system according to claim 1, characterized by the coil arrangement (16) being constituted by an essentially rectangular coil, comprising a coil frame and an electric conductor wrapped in one or more turns around the frame and being arranged at a certain level above a ground plane, the detection zone (18) being defined by an essentially parallel-epipedic volume between the coil and the underlying ground plane (21).

6. An article surveillance system according to claim 1, characterized in that the controller (14) is arranged to determine whether the demodulated signals ($i_{demod}$) are in phase with the modulating signals ($i_{mod}$) at a certain moment of time, thereby indicating that the sensor (20) is located inside the detection zone (18), and, if this is the case, to generate an alarm signal by means of the alarm device.

7. An article surveillance system according to claim 1, characterized in that the coil arrangement (16) comprises a plurality of adjacently arranged coils (16a, 16b, 16c), by means of which a respective detection sector (18a, 18b, 18c) is formed between a respective coil (16a, 16b, 16c) and an underlying ground plane (21).

8. An article surveillance system according to claim 7, characterized by the controller (14) and the driving means (17) being arranged to supply modulating signals of different frequencies to the respective coils (16a, 16b, 16c) for generating modulating fields of different frequency in each respective detection sector (18a, 18b, 18c).

9. An article surveillance system according to claim 7, characterized by the controller (14) and the driving means (17) being arranged to supply modulating signals in sequence to a respective coil (16a, 16b, 16c) during a respective time interval.

10. An article surveillance system according to claim 8, characterized by the controller (14) being arranged to separate from the demodulated signals $i_{demod}$) a signal component for each respective coil and being arranged to determine from these signal components the sector, in which the sensor (20) is located.

11. An article surveillance system according to claim 10, characterized in that at least two of the coils (16a, 16b, 16c; 16a-b, 16a'-b', 16a"-b") are arranged at an overlapping (d) with respect to each other, thereby together forming an overlapping sector (25), which is defined by a volume between the overlapping area (d) and an underlying ground plane, the controller (14) being arranged to continuously compare the signal components from said at least two coils for determining the position of the sensor (20) in relation to the overlapping sector and/or for detecting a direction of transfer for the sensor.

12. An article surveillance system according to claim 11, characterized by the controller (14) being arranged to supply modulating signals to said pairs of overlapping coils (16a, 16b, 16c; 16a-b, 16a'-b', 16a"-b"), wherein the resulting magnetic field vector of the magnetic modulating fields generated by the respective coils in each pair of coils has a constant direction in any position inside the overlapping sector (25) but a varying direction outside the sector.

13. An article surveillance system according to claim 7, characterized in that at least two of the coils (16a, 16b, 16c; 16a-b, 16a'-b', 16a"-b") are arranged at a certain rotation with respect to each other in the horizontal plane.

14. An article surveillance system according to claim 1, characterized in that the detection zone (18) is constituted by at least a part of a shop exit.

15. An article surveillance system according to claim 1, characterized by said sensor (20) comprising an element of an amorphous magnetic material, the permeability of said element being dependent upon the magnetizing field strength of the magnetic modulating field along a main direction of the element.

* * * * *

UNITED STATES PATENT AND TRADEMARK OFFICE
CERTIFICATE OF CORRECTION

PATENT NO. : 6,137,411
DATED : October 24, 2000
INVENTOR(S) : Tyren

Page 1 of 1

It is certified that error appears in the above-identified patent and that said Letters Patent is hereby corrected as shown below:

Title page,
Item [30] Foreign Application Priority Data, "9600528" should read -- 9600528-5 --; and "9601033" should read -- 9601033-5 --

Column 5,
Line 60, "i" should be in italics and should read -- *i* --.

Column 6,
Lines 27 and 30, "gr" should read -- $\mu_r$ --

Signed and Sealed this

Twenty-first Day of May, 2002

Attest:

Attesting Officer

JAMES E. ROGAN
Director of the United States Patent and Trademark Office